United States Patent [19]

Morishita

[11] Patent Number: 4,807,385
[45] Date of Patent: Feb. 28, 1989

[54] FISHING ROD TIP ROLLER

[76] Inventor: Harold H. Morishita, 105 Larose Ave. (Apt. 805), Weston, Ontario, Canada, M9P 1A9

[21] Appl. No.: 123,710

[22] Filed: Nov. 23, 1987

[51] Int. Cl.$^4$ .............................................. A01K 87/02
[52] U.S. Cl. ...................................................... 43/24
[58] Field of Search ........................... 43/24, 27.4, 27.2

[56] References Cited

U.S. PATENT DOCUMENTS

| | | | |
|---|---|---|---|
| 899,914 | 9/1908 | Smith | 43/24 |
| 1,116,721 | 11/1914 | Meder | 43/24 |
| 1,142,796 | 6/1915 | Brugman | 43/24 |
| 2,525,948 | 10/1950 | Ruiz | 43/24 |
| 2,878,609 | 3/1959 | O'Brien, Jr. | 43/24 |
| 3,006,099 | 10/1961 | Gourley, Jr. | 43/24 |
| 3,034,248 | 5/1962 | Williams | 43/24 |
| 3,967,405 | 7/1976 | Henze et al. | 43/24 |
| 4,248,002 | 2/1981 | McNellis | 43/27.4 |

FOREIGN PATENT DOCUMENTS

| | | | |
|---|---|---|---|
| 287415 | 3/1928 | United Kingdom | 43/24 |
| 1542260 | 3/1979 | United Kingdom | 43/24 |

*Primary Examiner*—Kurt Rowan

[57] ABSTRACT

A fishing rod tip roller assembly is attachable to a mount on the end of a fishing rod. A roller mounting lever carries a roller with an axis perpendicular to that of the rod and the lever is pivoted about a parallel axis on the assembly to move between positions aligned with and offset from the rod, such positions corresponding to the rod being used in reel up and reel down position.

10 Claims, 3 Drawing Sheets

FISHING ROD TIP ROLLER

This invention relates to a fishing rod tip roller assembly.

The invention is concerned with an accessory for fishing rods of the type having a reel. Such rods are more useful if they have at the tip a roller to carry the line from the reel on the rod down to the water and to retrieve it back onto the reel. The roller assists in the passage of the line to and from the rod. Thus the invention deals with an assembly for providing such a roller.

By the 'longitudinal axis' of the rod I mean that of the rod near the tip since the rod will obviously be somewhat bent in use. It is useful to note that such rods may be operated in the 'reel up' or 'reel down' position (reel and line above, or reel and line below, the rod, respectively). Therefore it is desireable that the rod with tip roller be useable with reel up or reel own.

By 'outer' and 'inner' herein I mean the directions toward and away from the tip, respectively, along the rod.

It is an object of the invention to provide a roller assembly having a roller mounted on a sleeve which is releasably mounted on an end mount for a fishing rod. With such arrangement, the owner of fishing rods may provide each of them with such an end mount and the sleeve with a roller may be quickly releasable from the end mount of one rod and attached to the end mount of another.

It is an object of the invention to provide a roller assembly as discussed in the previous paragraph, wherein the roller sleeve is allowed to pivot relative to the end mount, about the longitudinal axis of the sleeve, so that the roller may pivot to co-operate with the line to follow the pull from the water or from a fish on the line.

(The idea of having a tip roller pivotable about the longitudinal axis of a fishing rod is not broadly and by itself new. See for example the following patents:

|            |           |
|------------|-----------|
| Henze      | 4,167,829 |
| Boh        | 2,652,654 |
| Berry      | 2,324,353 |
| Montgomery | 2,113,707 |
| Wells      | 3,303,595 |

However applicant's mode of combining this feature with others and applicant's embodiment of the feature are felt to be novel.

It is an object of this invention to provide a roller wherein a roller sleeve is pivotable on a rod end mount about the longitudinal axis of the rod but is limited to an angular excursion of about 45° on each side of a median position where the roller axis is horizontal.

It is an object of this invention to provide a fishing rod tip roller assembly wherein a sleeve pivotably mounts a roller lever with the roller, with the lever pivot axis being parallel to the roller and said roller lever is selectively locatable in either first position where said roller axis is approximately aligned with said longitudinal rod axis or a second position where said roller axis is offset from said rod axis.

It is an object of this invention to provide a fishing rod tip roller assembly, wherein an end mount is designed for attachment to the end of the fishing rod and a groove is provided therein. Alternately, the rod itself may be provided with such an end mount. A sleeve mounting the tip roller is designed to slip over the rod tip mount and is provided with a digitally liftable dog lever into and out of said groove. The lever is biased to engaged position.

Figure 3:
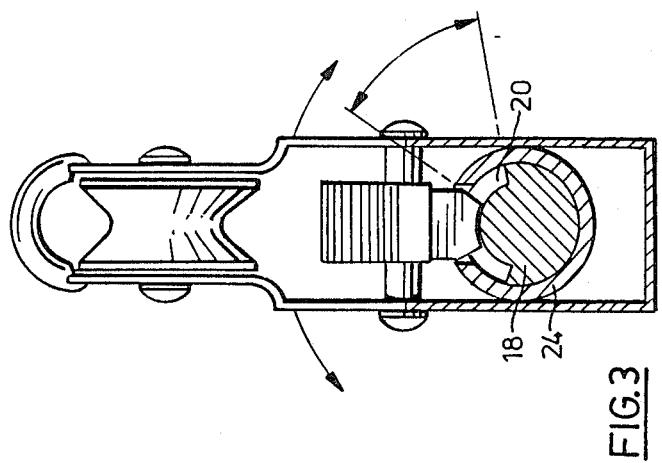
FIG. 3 is a vertical section along the lines 3—3 of FIG. 2, and, FIG. 4 is a partial section of the assembly in the 'reel down' position.

In the drawings the rod tip 10 is provided with an end mount 12 for mounting on the rod tip by friction or adhesive but should be mounted in such a way that it will not rotate along the longitudinal axis L of the rod. The end mount 12 thus is provided with a hollow bore to be frictionally attached to the rod and on its exterior surface is provided with of raised cylindrical bearing areas 14, 16 and 18 being located adjacent the outer end of the mount. The area 18 is provided with a circumferential groove 20 defining an upper arc of a little less that 180° as best shown in FIG. 3. Groove 20 has an inwardly facing shoulder at the outer end in the rod tip direction in at the inner end. Enlargement 18 ends in the rod tip direction in an outwardly directed hemisphere with a short rounded probe 19. It is within the scope of the invention to shape the rod tip 10 itself to provide the end mount. Rotatably mounted upon the bearing areas 18, 16, and 14 is the sleeve 24.

The sleeve 24 towards its outer end, is designed to pivotally mount a dog lever 30 having a dog 34 at the outer end projecting radially inward relative to the rod. The dog 34 is shaped when depressed to form a stop in groove 20 against movement of the sleeve off of the end mount and to resist movement of the sleeve on to the end mount past the point where dog 34 meets the chamferred face of groove 20. The dog lever 30 is spring biased by spring 32 to move the dog and its dog lever toward closed position. The dog lever is designed so that when the dog is engaged the groove 20, a portion 35 of the dog lever 34 extends inwardly of the pivot so that portion 35 of the lever may be depressed digitally against the spring bias to raise the dog out of the groove and thus release the sleeve for movement off the end mount 12. It will be further noted that the hemispherical end of bearing member 18 acts as a chamferred surface to cause the dog to rise upwardly thereover and rest in groove 20 on movement of the sleeve onto the mounting member.

Rigidly attached to the sleeve is the bracket 40 which, at its inward end, mounts the small grooved pulley 44 designed to carry the fishing line extending outwardly from the rod pulleys or guides while at the outer end of the bracket 40 has outwardly projecting ears 45 with apertures 46 aligned in a direction parallel to the axis of pulley 44 which direction will in the upper or lower median sleeve positions, be horizontal. A roller lever 47 is provided with an inner end having opposed plates with aligned apertures 48 designed to be received between ears 45 so that the apertures 48 align with apertures 46. To provide a pivoted joint a hollow bored pivot pin 50 extends through the aligned apertures. Pin 50 has a head 52, on its outer end and the bore in the pivot pin is provided with threading 54 to receive headed bolt 56 to maintain the pivot pin in place and acting as the pivot joint.

It will be noted that this arrangement allows ready removal and reinsertion of the pivot pin 50 to change one roller lever 47 for another, and the use of a hollowed bore pivot pin 50 reduces the likelihood of accidental loosening of bolt 56. As shown, the roller lever 47 outwardly of the pivot pin comprises a pair of opposed plates 58 pivotally mounting between them the tip roller 60 and the plates 58 are joined by upper and lower guides 62 for maintaining the line on the pulley. Also provided is a pivoted guide 64 which pivots about the axis of the roller on each side of the plates 58 and carries an additional pair of line guides 65. Thus the pivoting guide may pivot to follow the forces placed on it by the line 11.

An inwardly directed cylindrical surface 65 surrounds the apertures 46 and is concentric therewith. Surface 65 has a pair of apertures 62a, 62b each shaped to receive the probe 19.

Figure 1:
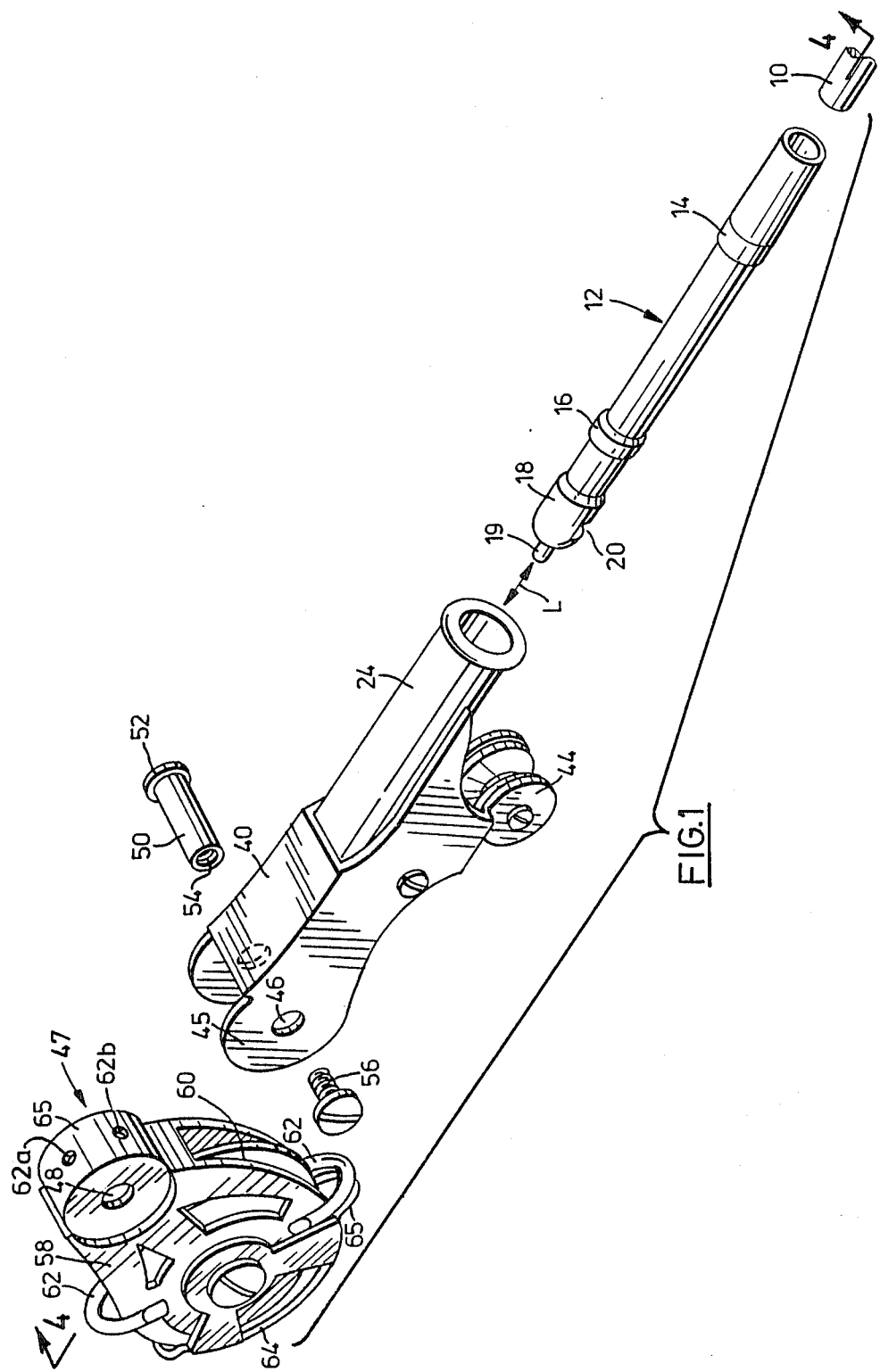
FIG. 1 is an exploded perspective view of the fishing rod tip roller assembly, in the reel down position.
Figure 2:
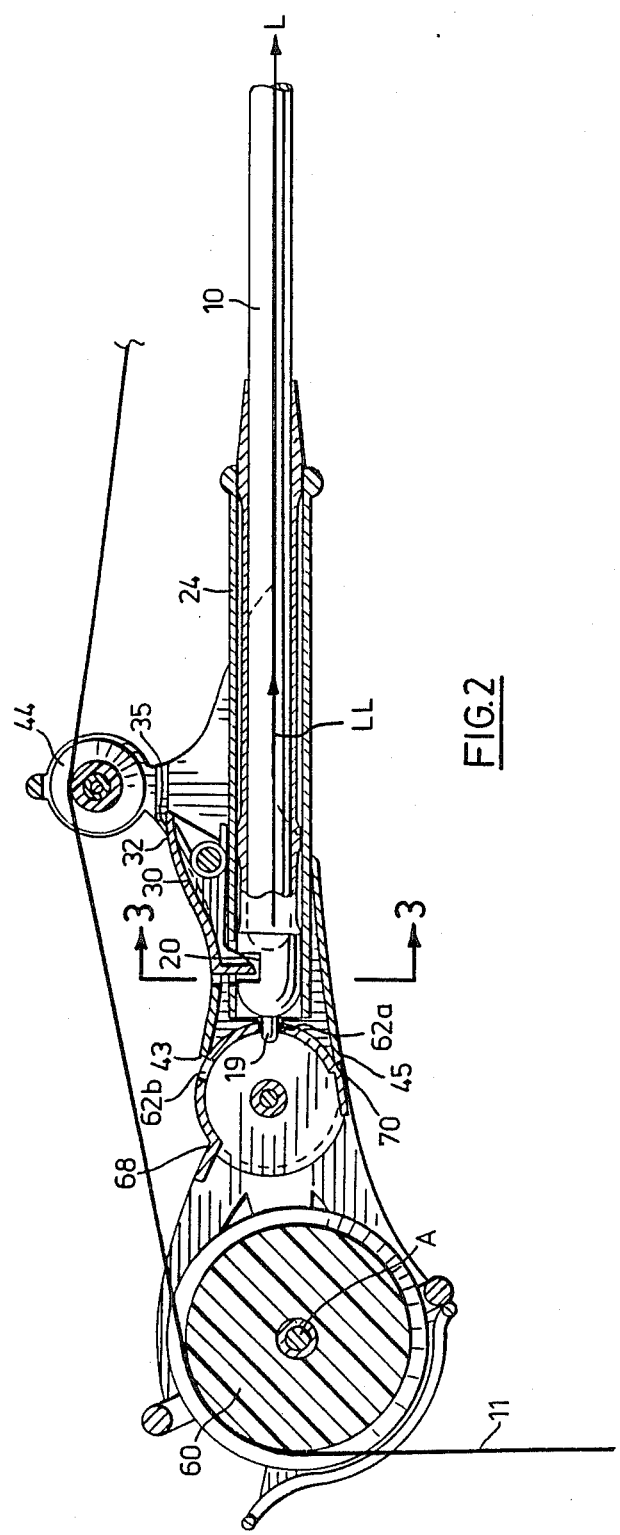
FIG. 2 is a vertical cross section of the roller assembly arranged for 'reel up' operation.
Figure 4:
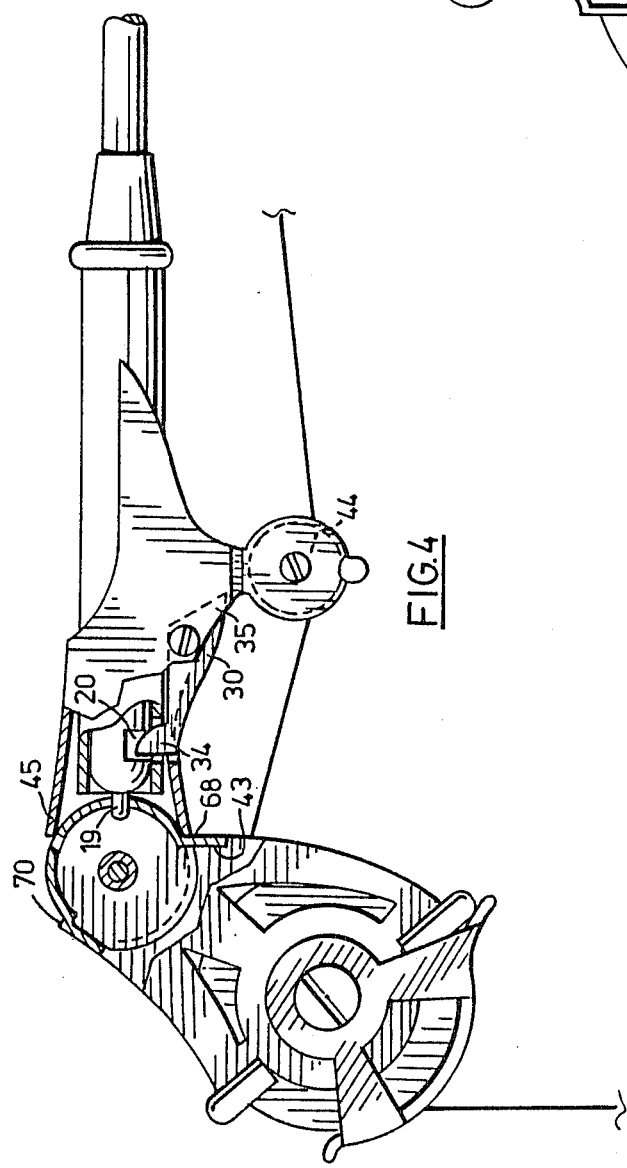

As illustrated in FIG. 2, aperture 62a is located so that when it receives probe 19, it holds roller lever 47 with the roller axis A approximately aligned with the longitudinal axis of the rod while the aperture 62b when it receives probe 19 will hold the roller lever 47 offset from the axis of the rod, as best shown in FIG. 4. This offset appears as of it would be upward in FIG. 2. However, from the FIG. 2 position, the rod and sleeve are together rotated 180° to reach the reel down position so that the offset of axis A is used to maintain the lever and roller below the rod tip axis in the "reel down" position of the rod.

If the rod tip roller assembly is connected to the rod tip with the end mount in the reel up position it may be desired to move to the "reel down" position. If so it is assumed that the line will be removed from rollers 44 and 60. In the FIG. 2 position, the dog lever extent 35 is digitally depressed to move dog 34 out of groove 20. The sleeve is then slid off the end mount until probe 19 is removed from aperture 62a. The roller lever is then pivotted to offset position (relative to FIG. 2) so that, on sliding the sleeve back into the end mount, probe 19 is received in aperture 62b. Thus when the sleeve is moved inwardly onto the end mount, (with the lever digitally released to act under its own bias) dog 34 comes to rest in groove 20 and the "reel down" position of FIG. 4 is achieved by rotating the rod 180°. The line from roller 44 is withdrawn from the top of roller 60 as shown in FIG. 2 and then threaded between pivot 50 and over roller 60 in the orientation of FIG. 4. Converting the assembly from the "reel down" position of FIG. 4 the "reel up" position of FIG. 2 involves a reversal of the above procedures.

Bracket 40 and hemi-cylindrical surface 65 are provided with cooperating surfaces 43 and 68 (see FIG. 4) to limit movement of the roller lever toward offset position. This both assists in aligning aperture 62b with probe 19 (when converting to the offset arrangement) but reduces the stress exerted on probe 19. Bracket 40 and hemi-cylindrical surface 65 are provided with cooperating surfaces 45 and 70 (see FIG. 2) to limit movement of the roller lever toward aligned position. Bracket 40 and hemi-cylindrical surface 65 are provided with co-operating surfaces 45 and 70 (see FIG. 2) to limit movement of the roller lever toward aligned position. This both assists in aligning aperture 62a with probe 19 (when converting to the aligned arrangement) but reduces the stress exerted on probe 19.

The user may have a single or multiple number of rods each with an end mount 12.

To place the tip roller assembly in place the sleeve 24 is simply slid on to the end mount until the dog 34 comes to rest in groove 20. For use in the "reel up" position the sleeve is oriented so that the dog 34 moves into groove 20 with the roller lever oriented so that probe 19 rests in aperture 62a.

The rod may then be used and the deflection of the line from vertical will cause the sleeve to pivot about 45° on either side of its median position with the dog 34 riding in the groove 20.

When the sleeve, lever and roller are to be used in the "reel down" position then the conversion is performed as previously described. Again roller lever assembly may pivot about its median position to allow the roller to follow across the line to cause the roller to follow the deflections of the line over about 45° extent, with dog 34 riding in groove 20.

When it is desired to remove the rod tip roller assembly from the end mount in either position of roller lever 47 it is merely necessary to digitally depress the inward portion 35 of the lever to remove the dog 34 from the groove 20 and the rod tip roller assembly may be merely slid off. The sleeve may be slid on to another rod by merely sliding on in the desired lever and axial orientation until the dog 34 catches in the groove 20 in the correct orientation of the rod tip roller assembly and probe 19 in aperture 62a or 62b in the correct orientation of the lever. Thus the sleeve and assembly is easily attachable and removeable and may easily be switched from one rod to another and from "reel up" to "reel down" position.

The roller 60 and its bracket 58 may be changed for another (that is to replace a lever with a large roller 60 for a lever with a small roller or vice versa) by removal of the pin 50 and replacement to pivot the new lever.

I claim:

1. Fishing rod tip roller assembly comprising:
   end mount provided on the end of a fishing rod,
   roller assembly provided with a sleeve designed to slide over said mount,
   co-operating means on said sleeve and said end mount for releasably fixing said sleeve against axial translation relative to said tip,
   said co-operating means being designed to allow rotation of said sleeve relative to said end mount about the longitudinal axis of the outer end of said rod,
   roller mounting lever mounted on said sleeve to pivot about an axis perpendicular to said longitudinal axis,
   a grooved roller for receiving fishing line from said rod mounted on said mounting lever to rotate about an axis substantially parallel to said lever axis,
   said lever being pivotable between a first position where said roller axis is approximately aligned with said longitudinal axis and a second position where said roller axis is offset from said rod axis,
   means for releasably locking said lever in a selected one of said first and second positions,
   said lever and roller being designed, in said first position to carry line form rod when the rod reel and line are above the rod and, in said second position to have said roller axis below said rod axis and to carry line from a rod having the reel and line below the rod.

2. Fishing rod tip assembly comprising:

sleeve for mounting on the tip of a fishing rod, roller mounting lever mounted on said sleeve to pivot about an axis perpendicular to the longitudinal axis of said rod, a grooved roller mounted on said mounting lever to rotate about an axis substantially parallel to said lever axis, said lever being pivotable between a first position where said roller axis is approximately aligned with said longitudinal axis and a second position where said roller axis is offset from said axis, means for releasably locking said lever in a selected on of said first and second position, said lever and roller being designed in said first position to carry line from a rod with the fishing rod reel and line above the rod and, in said second position, to have said roller axis below said rod axis and to carry line from a rod having the reel and line below the rod.

3. Fishing rod tip, roller assembly as claimed in claim 2 wherein said lever is releasably mounted on said sleeve whereby one lever and roller may be replaced by another.

4. Fishing rod assembly as claimed in claim 3 wherein an internally threaded hollow pin is arranged to act as the pivot pin between said lever and said sleeve, a bolt designed to thread into said pin to retain it in position and to be removable to allow removal of and replacement of said lever and roller.

5. Fishing rod tip assembly as claimed in claim 2 wherein said sleeve is releasably mounted on said tip.

6. Fishing rod tip roller assembly, comprising:
end mount designed for attachment to the end of a fishing rod,
roller assembly provided with a sleeve designed to slide axially over said end mount,
cooperating means on said sleeve and said end mount for releasably fixing said sleeve against axial translation relative to said tip,
manually depressable means for releasing said sleeve from said mount for axial translation there off,
roller mounted on said assembly to carry the line over from the rod.

7. Fishing rod assembly as claimed in claim 6 wherein said cooperating means between said sleeve and said end mount is designed to allow rotation of said sleeve relative to said end mount about the longitudinal axis of the outer end of said rod.

8. Fishing rod assembly as claimed in claim 7 wherein means are provided to limit said sleeve rotation to about 45° on each side of a median position where said roller axis is horizontal.

9. Fishing rod tip roller assembly, comprising:
end mount designed for attachment to the end of a fishing rod,
roller assembly provided with a sleeve designed to slide over said end mount,
cooperating means on said sleeve and said end mount for releasably fixing said sleeve against axial translation relative to said tip,
roller mounted on said assembly to carry the line over from the rod,
wherein said cooperating means comprises a groove in said end mount, extending transverse to the longitudinal axis of said rod and a dog in said sleeve moveable between an engaged position in said groove, whereby said sleeve is locked against axial movement, and a release position free of said groove whereby said sleeve is free to move on or off said rod.

10. Fishing rod tip roller assembly, as claimed in claim 9 wherein said dog is spring biased to engaged position and digitally operable means are provided to move said dog the release position.

* * * * *